United States Patent [19]
Mohler

[11] 3,714,518
[45] Jan. 30, 1973

[54] ELECTROMECHANICAL STEPPING MECHANISM FOR POSITIONING LOAD DEVICES

[75] Inventor: David Brian Mohler, West Milton, Ohio

[73] Assignee: Ledex, Inc., Dayton, Ohio

[22] Filed: Dec. 8, 1971

[21] Appl. No.: 205,893

[52] U.S. Cl. .................................................317/139
[51] Int. Cl. ............................................H01h 47/14
[58] Field of Search..............................317/139, 140

[56] References Cited

UNITED STATES PATENTS 3,435,297  3/1969  Pearse ...................................317/139

*Primary Examiner*—L. T. Hix
*Attorney*—H. Talman Dybvig

[57] ABSTRACT

An electromechanical mechanism for selectively positioning a plurality of movable devices comprises a plurality of rotary stepping motors, there being one stepping motor for driving each of said movable devices. Each stepping motor also drives a pair of oppositely acting alternate step switches. Each stepping motor is series connected to an operating voltage through one of the alternate step switches which it drives and one of the alternate step switches driven by another of the stepping motors. When a first stepping motor receives an operating voltage it steps one of its alternate step switches to interrupt its own power supply and simultaneously steps its other alternate step switch to close a power supply to a second stepping motor. This allows the second stepping motor to operate while the first stepping motor resets to its starting position. As one example, the movable devices positioned by the stepping motors are voltage distributor switches.

7 Claims, 1 Drawing Figure

PATENTED JAN 30 1973
3,714,518
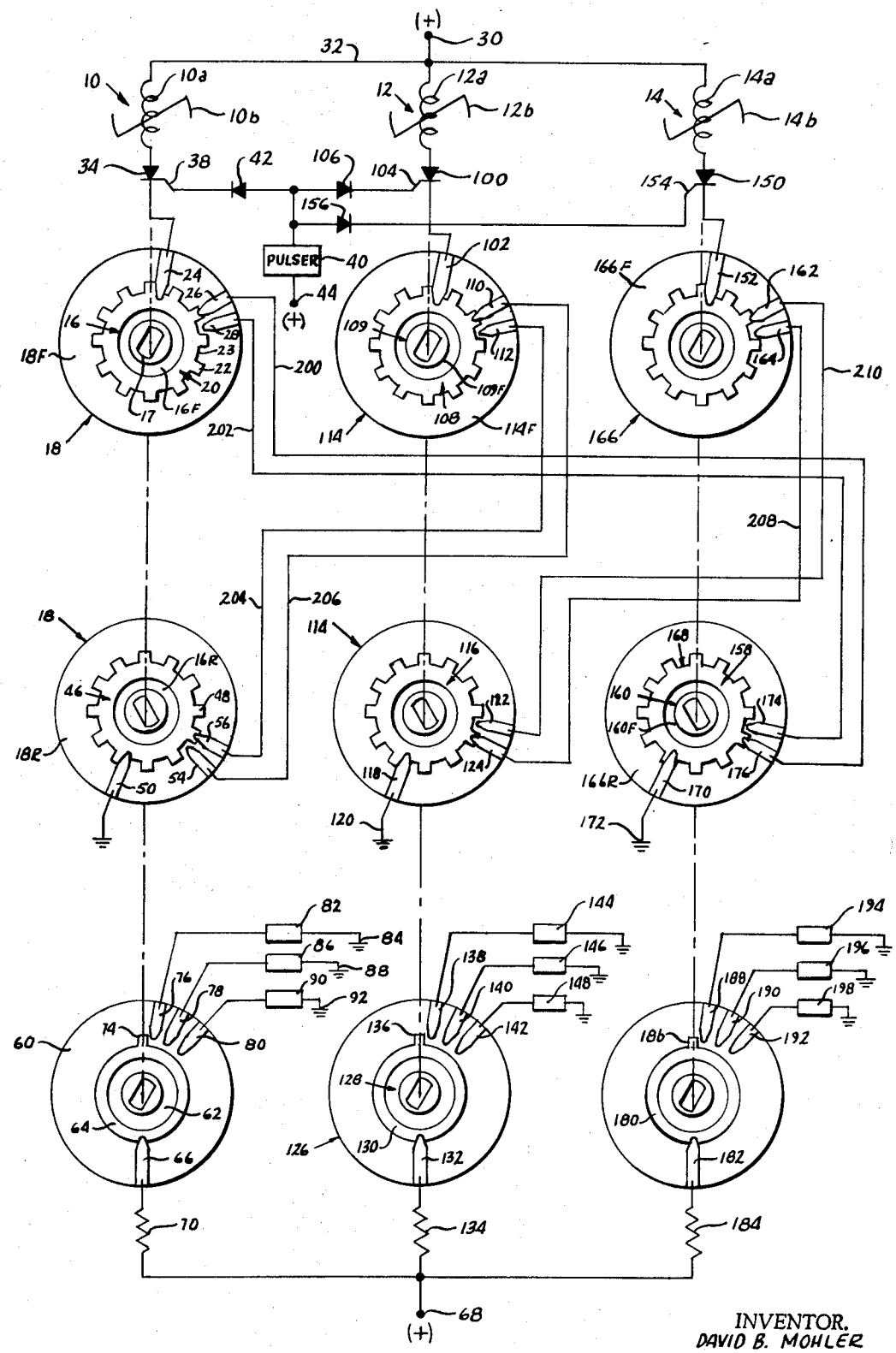
INVENTOR.
DAVID B. MOHLER
BY H. Talman
ATTORNEY 3,714,518

ELECTROMECHANICAL STEPPING MECHANISM FOR POSITIONING LOAD DEVICES

BACKGROUND OF THE INVENTION

1. Field of the Invention

This invention relates to electromechanical stepping mechanisms for positioning load devices such as rotary electrical switches. More particularly, the invention relates to solenoid operated stepping mechanisms which must reset after each operation thereof and to circuitry which allows one or more additional stepping mechanisms to operate during the time required for a previously operated stepping mechanism to reset.

2. Description of the Prior Art

Prior art systems for positioning rotary electrical switches and the like have utilized rotary solenoid operated stepping motors designed to step a rotary switch unidirectionally through a plurality of circularly arranged contact-making positions. The conventional solenoid operated stepping motor utilizes an armature which, during a power stroke, is drawn by the magnetic field of an electromagnet against the resistance of a return spring to a position in which the armature interrupts the power supply to the electromagnet, thus allowing a return stroke during which the return spring returns the armature to its starting position. The armature thus reciprocates through a power stroke and a return stroke. This reciprocating or oscillating motion is converted to a unidirectional stepping motion by means of a one-way clutch mechanism. Such mechanism is frequently a pair of engaging ratchets which slip in one direction. The clutch mechanism allows the energy of either the electromagnet or the spring to drive a driven load in one direction and slips in the opposite direction. Most typically, the one-way clutch mechanism is so arranged that the load is driven by the electromagnet energy, however, it can be so arranged that the return force of the spring is used to drive the load.

Regardless of which clutch arrangement is used, approximately half of the rotary solenoid operation is a type of lost motion. Thus, if the clutch is arranged to step the load during the power stroke the load remains idle during the return stroke. Likewise, if the clutch is so arranged that the spring drives the load during the return stroke, the load remains idle during the period that the rotary solenoid is energized to return energy to the spring.

It is an object of the present invention to increase the rate at which loads, more specifically electrical switches, can be sequentially positioned by utilizing a plurality of stepping motors and allowing one or more stepping motors to operate during the time that has been lost in prior art systems for the reasons described above.

Other objects and advantages reside in the circuit arrangements illustrated in the accompanying drawing, as will become more apparent from the following description.

SUMMARY OF THE INVENTION

The present invention satifies the foregoing objects by utilizing a plurality of stepping motors and causing each stepping motor to position not only its load but also a pair of alternate step switches. The alternate step switches are essentially electromechanical flip flops. Each of the stepping motors receives an operating voltage through a series circuit which includes an alternate step switch which it drives and an alternate step switch driven by another of the stepping motors. The simplest circuit would include only two stepping motors each driving two alternate step switches. When one stepping motor steps, it drives a first of its own alternate step switches to an open position to interrupt its own power supply and simultaneously drives the second of its own alternate step switches to a closed position to complete the power supply to the other stepping motor. Then, when the other stepping motor operates, it drives one of its own alternate step switches to an open position to interrupt its own power supply and simultaneously drives the other of its own alternate step switches to a closed position to complete a power supply to the first stepping motor through its second alternate step switch.

BRIEF DESCRIPTION OF THE DRAWING

The single FIGURE is a schematic diagram of a preferred embodiment of the present invention.

DESCRIPTION OF THE PREFERRED EMBODIMENT

The present invention is applicable to the sequential operation of two or more rotary solenoid devices. For convenience of description, the accompanying drawing schematically illustrates three rotary solenoid devices numbered 10, 12 and 14 which are to operate in a sequence wherein the operation of the solenoid 12 follows operation of the solenoid 10 and the operation of the solenoid 14 follows the operation of the solenoid 12. The illustration of three sequentially operated solenoids teaches the circuit features which would allow the design of a circuit involving only two sequentially operated solenoids and also the circuit features which would allow the extension of the present invention to circuits utilizing more than three solenoids.

Since rotary solenoid stepping motors are already well known in the art, the rotary solenoids 10, 12 and 14 are only schematically illustrated by a symbol depicting the presence of a coil together with the presence of an armature having a rotary stroke. The coils for the rotary solenoids 10, 12 and 14 are identified by the reference numerals 10a, 12a and 14a, respectively. Likewise, the schematically illustrated armatures for the solenoids 10, 12 and 14 are represented by symbols identified by the reference numerals 10b, 12b and 14b, respectively. No attempt has been made to schematically illustrate the one-way clutch which is used to convert the rotary solenoid to a stepping motor since this is not a part of the electrical circuit and is conventional. Likewise, no attempt has been made to illustrate the detent mechanism conventionally employed in rotary stepping motors to hold the motor output shaft at each new position to which it is stepped. A rotary solenoid driven stepping motor suitable for use in the present invention is fully described in U. S. Pat. No. 3,320,822.

Drivingly connected to the solenoid 10 by a one-way clutch, not shown, is a rotor wafer 16 having a front face 16F and a rear face 16R. This rotor has a double D shaped aperture 17 adapted to receive an output shaft (not shown) from the one-way clutch driven by the rotary solenoid 10. The rotor wafer 16 is rotatably received within a stator wafer 18 having a front face 18F and a rear face 18R. Affixed to the front face of the rotor wafer 16 is an annular conductor 20 having an outer periphery shaped to provide peripherally spaced outwardly projecting contact blades 22, there being a notch 23 in the periphery of the conductor 20 between each pair of adjacent contact blades 22.

As will be more fully explained in following parts of this specification, the conductor 20 is continuously engaged by a voltage supply contact 24 fixedly mounted to the front face of the stator wafer 18. Positioned for periodic engagement with the conductor 20 are two additional stator contacts 26 and 28 fixedly mounted to the front face of the stator wafer 18. The conductor 20 can be seen to have 12 blades 22 spaced at 30° intervals. The blades 22 each subtend 15° and, likewise, the notches 23 each subtend 15°. The rotary solenoid 10 with its accompanying one-way clutch, not shown, is designed to execute a 15° stroke upon each energization thereof. In accordance with this invention, the stator contacts 26 and 28 can be spaced 15° apart as shown, but may alternatively be spaced by any integral multiple of 30° plus an additional 15°.

As appears in FIG. 1, the contact 26 presently engages one of the blades 22. Upon execution of a 15° clockwise stroke of the rotor wafer 16 resulting from energization of the solenoid 10, the rotor contact blade 22 presently engaging the stator contact 26 will step 15° to a position engaging the stator contact blade 28. By reason of such motion, a notch 23 will then confront the stator contact 26. Those skilled in the art will recognize the assembly of the rotor conductor 20 with respect to the stator contacts 24, 26 and 28 to be an alternate step switch device having three terminals, namely the stator contacts 24, 26 and 28. The conductor 20 functions as a movable contact which is stepped to engage the stator contact 26 on alternate operations of the rotary solenoid 10 and to engage the stator contact 28 on the intermediate operations of the solenoid 10. Accordingly, whatever voltage is present on the supply contact 24 appears alternately on the stator contact 26 and intermediately on the stator contact 28.

A second and electrically separate alternate step switch device is assembled on the rear faces of the rotor wafer 16 and the stator wafer 18. This second alternate step switch device comprises an annular conductor 46 having 12 equally spaced blades 48, a voltage or ground supply conductor 50 which continuously wipes the conductor a voltage or ground supply and stator contacts 54 and 56 spaced apart 15° and intermittently wiped by the blades 48. In the rotor position shown and after alternate steps therefrom, the stator contact 56 will be grounded. During the intermediate steps, the stator contact 54 will be grounded.

Drivingly connected to the output shaft (not shown) driven by the solenoid 10 is a second rotor wafer 62 rotatably mounted within a second stator wafer 60. The rotor wafer 62 is not an essential part of the present invention. Rather, it represents but one of a vast number of types of devices which can be selectively positioned with aid of the present invention.

As is conventional in the rotary switch art, the stator wafer 18 is ganged to the stator wafer 60 by a supporting structure, not shown, which prevents rotation of both stator wafers but allows rotation of the rotor wafers. Affixed to the rotor wafer 62 is an annular conductor 64 which continuously wipes a stator contact 66. Projecting radially outwardly from the conductor 64 is a contact blade or distributor tab 74 which can sequentially wipe contacts such as shown at 76, 78 and 80 which are affixed to the stator wafer 60. The stator contact 66 is continuously supplied through a resistor 70 a positive D.C. voltage present at a terminal 68.

It will be noted that the distributor tab 74, at the instant illustrated in the drawing, is spaced 150° to the counter-clockwise side of the stator contact 76, and the contacts 78 and 80 are respectively 15° and 30° clockwise of the contact 76. Connected respectively to the contacts 76, 78 and 80 are load devices 82, 86 and 90, the three load devices being grounded as shown at 84, 88 and 92.

Upon a first energization of the rotary solenoid 10 after the instant shown in the drawing the tab 74 will move to touch the stator contact 76, thereby applying the voltage present at the terminal 68 to the load device 82. the resistor 70 limiting the current through the load 82. The precise nature of the load devices 82, 86 and 90 is not a critical feature of the present invention. The load devices might be the lights of a theater marque or rockets to be ejected from an airplane or any of a vast number of different types of devices that are to be energized in a predetermined or desired sequence. The use of the current limiting resistor 70 is merely a conventional precaution to prevent damage to the voltage supply at the terminal 68 should one of the load devices be defective so as to produce a short circuit between ground and the voltage supplied to the terminal 68.

Those skilled in the art will recognize the switch elements mounted on the stator wafer 60 and rotor wafer 62 as constituting what has commonly been called a distributor switch, the tab 74 distributing the voltage available to the stator contact 66 successively to each of the contacts 76, 78 and 80 with the first three operations of the solenoid 10. While only three contacts 76, 78 and 80 are positioned on the stator 60 to engage the tab 74, it will be understood that additional contacts might be positioned on the wafer 60 as desired, and the presence or absence of a contact at any given switch position including the three illustrated is entirely arbitrary insofar as the practice of the present invention is concerned.

The rotary solenoid 12 is drivingly connected through a one-way clutch, not shown, to switch devices which basically duplicate those described with respect to the rotary solenoid 10. Thus, the solenoid 12 is drivingly connected to a first alternate step switch having a voltage input contact 102 mounted on the front face 114F of a stator wafer 114, an annular conductor 108 similar to the previously described conductor 20 affixed to the front face 109F of the rotor 109 and stator contacts 110 and 112 adapted to alternately engage the conductor 108.

Likewise, the rear faces of the stator 114 and rotor 109 support an annular conductor 116 analogous to the previously described conductor 46, a stator contact 118 grounded at 120 which continually wipes the conductor 116, and spaced stator contacts 122 and 124 which alternately engage blades projecting outwardly from the conductor 116.

The rotary solenoid 12 is also drivingly engaged to a distributor switch mechanism assembled on a stator 126 and a rotor 128, the rotor 128 supporting an annular conductor 130 having a distributor tab 136. The conductor 130 is continuously engaged by a stator contact 132 connected to the voltage source at the terminal 68 through a current limiting resistor 134. The voltage thus applied to the conductor 130 is sequentially stepped to stator contacts 138, 140 and 142, connected respectively to loads 144, 146 and 148.

The rotary solenoid 14 is drivingly connected through a one-way clutch, not shown, to an assembly of switch devices which again substantially duplicates the switch devices driven by the solenoid 10. Thus, the 14 drives a first alternate step switch mounted on the front face 166F of a stator 166 and on the front face 160F of a rotor 160. Voltage supplied to a stator contact 152 continuously wiping a rotor conductor 158 is thus alternately supplied to stator contacts 162 and 164.

The rotary solenoid 14 also drives a second alternate step switch assembled on the rear faces 166R and 160R of the stator 166 and rotor 160. A stator contact 170 grounded at 172 continuously wipes a rotor conductor 168 which alternately applies ground to stator contacts 174 and 176.

An output function is derived from the operation of the rotary solenoid 14 by means of a distributor switch drivingly connected to the solenoid 14, and having an annular conductor 180 continuously wiped by a voltage supply contact 182 receiving the voltage available at the terminal 68 through a current limiting resistor 184. The conductor 180 has a distributor tab 186 which progressively wipes stator contacts 188, 190 and 192 connected respectively to load devices 194, 196 and 198.

A voltage sufficient to operate each of the rotary solenoids 10, 12 and 14 is made available at a terminal 30 which connects to one end of each of the coils 10a, 12a and 14a through a conductor 32. The voltage supplied to the terminal 30 can be considered as representing one terminal of a battery connected to ground at its opposite terminal. In order for any one of the rotary solenoids 10, 12 or 14 to operate, it is necessary that one of the respective coils 10a, 12a or 14a be presented with a path to ground. Further, in order to have control over the speed with which the circuit will operate, this usually but not always being desirable, controlled rectifiers 34, 100 and 150 control the access of ground to the respective coils 10a, 12a and 14a. The operation of the controlled rectifiers 34, 100 and 150 is conveniently governed by a pulser 40 receiving power from a voltage supplied to a terminal 44, the pulser 40 generating pulses at whatever frequency may be desired, the pulses being simultaneously supplied to each of the gates 38, 104 and 154 of the respective controlled rectifiers 34, 100 and 150. Blocking diodes 42, 106 and 156 isolate the controlled rectifiers so that the presence of a conductive state in one of the controlled rectifiers will not serve to gate other of the control rectifiers.

The drawing illustrates the circuitry at a start-up position before any of the loads to be operated by the distributor switches have been energized. In this start-up position, the coil 10a has a path to ground which is being interrupted by the controlled rectifier 34. The path to ground extends from the coil 10a through the controlled rectifier 34, the contact 24 on the first alternate step switch driven by the solenoid 10, the annular conductor 20 on the same alternate step switch, the stator contact 26 on the same alternate step switch, and a conductor 200 leading to the second alternate step switch driven by the solenoid 14. The conductor 200 finds a path to ground through the stator contact 176 and through the conductor 168 to the grounded contact 170 on this second alternate step switch driven by the solenoid 14. Assuming the pulser 40 is generating periodic pulses effective to gate the controlled rectifiers shown in the circuit, a pulse will be received to gate each of the controlled rectifiers 34, 100 and 150 to its conductive state, however, the controlled rectifiers 100 and 150 have no path to ground in the circuit position shown and therefore do not become conductive. The controlled rectifier 34, however, has a path to ground as previously described and therefore becomes conductive, allowing the coil 10a to attract its associated armature 10b and thereby advance the alternate step switches and the distributor switch driven by the solenoid 10 through a 15° step in the clockwise direction.

By the end of this first step several events will have occurred. The first alternate step switch driven by the solenoid 10 steps to interrupt the connection between the stator contact 26 and the conductor 20 and to also make a connection between the conductor 20 and the stator contact 28. This interrupts the ground path for the solenoid coil 10a and this causes the controlled rectifier 34 to switch to its non-conducting state, allowing a return spring, not shown, to return the armature 10b to its initial position.

The connection established between the conductor 20 and the stator contact 28 is without immediate effect for the reason that the stator contact 28 connects through a conductor 202 to a stator contact 174 on the second alternate step switch driven by the solenoid 14 and at this time the stator contact 174 merely enters a notch of the conductor 168 and is thus isolated.

A second event occurring during the first step of the solenoid 10 is that the distributor tab 74 engages a stator contact 76 on the distributor switch driven by the solenoid 10 thus energizing the load 82.

A third event occurring during the first step of the solenoid 10 is that the second alternate step switch is rotated 15° to transfer ground from its stator contact 56 to its stator contact 54. The ground on the stator contact 56 had been unimportant because this ground was merely relayed through a conductor 204 to an isolated stator contact 112 on the first alternate step switch driven by the solenoid 12. The transfer of ground to the contact 54 allows the ground to be relayed through a conductor 206 to a stator contact 110 on the first alternate step switch driven by the solenoid 12. Since the stator contact 110 engages the conductor 108 on the first alternate step switch associated with the solenoid 12 the solenoid 12 has now been provided with a ground path through its controlled rectifier 100.

It can be assumed that the pulser 40 has been preset to generate successive pulses which are spaced in time by an interval larger than the time required for any given solenoid to execute its 15° step. Thus, after the solenoid 10 has operated upon receipt of a first pulse to execute a 15° step, a second pulse generated by the pulser 40 will gate the controlled rectifier 100 to cause the solenoid 12 to energize. In this case, the ground path for the coil 12a is through the controlled rectifier 100, across the first alternate step switch driven by the solenoid 12 to the stator contact 110, through the conductor 206 and across the second alternate step switch driven by the solenoid 10.

The following events occur when the solenoid 12 operates to produce a 15° step. The tab 136 on the distributor switch driven by the solenoid 12 energizes the load 144. The conductor on the first alternate step switch driven by the solenoid 12 interrupts the ground path for the coil 12a thus switching the controlled rectifier 100 to its non-conducting state. At essentially the same time, the first alternate step switch establishes a connection between its conductor 108 and the stator contact 112. Of course, at this point in time, the stator contact 112 which is connected by the conductor 204 to the stator contact 56 on the first alternate step switch driven by the solenoid 10 has been disabled by the prior operation of the solenoid 10 which isolated the stator contact 56. The solenoid 12 also advances its second alternate step switch 15° to transfer ground from the stator contact 124 to the stator contact 122.

The ground on the stator contact 124 has previously been of no effect because the contact 124 was connected through its conductor 208 to an isolated contact 164 associated with the first alternate step switch driven by the solenoid 14. On transfer of the ground to the stator contact 122, however, the solenoid 14 is provided with a ground path through its controlled rectifier 150, its first alternate step switch, the conductor 210 and the second alternate step switch driven by the solenoid 12.

Upon generation of the next pulse by means of the pulser 40 the controlled rectifier 150 becomes conductive to energize the solenoid 14, causing this solenoid to take its 15° step. This causes the distributor switch driven by the solenoid 14 to energize the load 194. It also causes the first alternate step switch driven by the solenoid 14 to interrupt the ground path for the solenoid 14, thus switching the controlled rectifier 150 to its non-conductive state. At essentially the same time, the first alternate step switch driven by the solenoid 14 establishes a connection between the stator contact 164 and the conductor 158. This connection will ultimately become a ground path through the second alternate step switch driven by the solenoid 12 but this ground path will not be completed until the solenoid 12 is again operated. The 15° step executed by the solenoid 14 has also advanced the second alternate step switch driven by the solenoid 14 to transfer ground from the stator contact 176 to the stator contact 174. This provides an immediately available ground path for the coil 10a of the solenoid 10, this ground path extending from the stator contact 174 of the second alternate step switch driven by the solenoid 14 through the conductor 202 to the first alternate step switch driven by the solenoid 10.

From the preceding description of the circuit operation it can be seen that the initial operation of the solenoid 10 set up an immediately available ground path for the solenoid 12 through the conductor 206 and commenced a new ground path for itself through the conductor 202. This new ground path was not completed, however, until the solenoid 14 had operated. Thus, the solenoid 10 operates to set up the solenoid 12 for operation. Then, the solenoid 12 operates to set up the solenoid 14 for operation and when the solenoid 14 operates it completes the ground path for the solenoid 10 which was commenced by the first operation of the solenoid 10.

From this description, it is believed apparent that the three solenoids 10, 12 and 14 will be energized one after the other indefinitely for as long as pulses are supplied by the pulser 40. It is also apparent that the load devices operated by the distributor switches driven by the solenoids 10, 12 and 14 will be successively energized in the following order: 82, 144, 194, 86, 146, 196, 90, 148 and finally 198. Loads can be added to or removed from this sequence as desired since the solenoid circuitry is electrically independent of the load circuitry.

A unique advantage of the present invention is that, upon operation of a given stepping motor such as the stepping motor 10 to energize its load 82, the load 82 will remain exposed to an operating voltage from the distributor tab 74 throughout the succeeding steps of the stepping motors 12 and 14. The period time a given load remains energized is commonly called the "dwell" time. The period of time between successive solenoid operations can be called the "succession" time, and it can be noted that the dwell time for the various loads illustrated in the drawing significantly exceeds the succession time between successive operations of the rotary solenoids 10, 12 and 14. By way of contrast, a single stepping motor progressively moving a single distributor switch to successively operate a plurality of loads necessarily provides a dwell time, as to each load being operated, which is smaller than the succession time between successive operations of the single stepping motor. An advantage thus resides in the ability of the circuitry described to provide a dwell time as to each load being operated which exceeds the succession time between successive stepping motor operations.

The minimum number of solenoid devices that will support a circuit of the type described is two. Assuming only two solenoid devices each driving a pair of alternate step switches, as described, the first to operate solenoid completes a ground path through one of its alternate step switches for the second solenoid and at the same time commences a new ground path for itself. The second to operate solenoid then interrupts its own ground path through one of its two alternate step switches and completes a ground path back to the first to operate solenoid with the other of its alternate step switches.

This circuit operation can be extended to any number of solenoids and it is unimportant how the alternate step switches of the various solenoids are interconnected provided the two contacts of the alternate step switch connected to the positive side of the power supply for one rotary solenoid are always connected to the two contacts of the grounded alternate step switch driven by another solenoid and provided further than the alternate step switches are phased to make circuit continuity in the manners shown and described with reference to the accompanying drawing.

Those skilled in the art will recognize that while the present application illustrates and describes rotary stepping devices which step through 24 positions, the practice of the present invention is not limited to 24 position stepping devices and more particularly, is not limited to interconnections between stepping devices each stepping through the same number of positions.

The accompanying drawing illustrates the use of controlled rectifiers together with a pulser to regulate the succession time at which the circuit operates. If the pulser is eliminated and the controlled rectifiers replaced by conductors, the circuit will nevertheless operate in the manner described except that when the solenoid 10 takes a step, the solenoid 12 will operate as soon as the solenoid 10 completes a ground path for the solenoid 12, then the solenoid 14 will operate as soon as the solenoid 12 completes a ground path for the solenoid 14. Assuming further that the solenoid 10 will have reset before the solenoid 14 completes a ground path for the solenoid 10, the succession time will substantially equal the time required for any one solenoid to execute its power stroke, i.e., the step time.

Although the preferred embodiments of the devices have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An electromechanical mechanism for selectively positioning a plurality of movable devices, said mechanism comprising, in combination: a plurality of stepping motors, each having an electromagnet coil, there being one stepping motor drivingly connected to each of said movable devices; a plurality of pairs of alternate step switches, each stepping motor drivingly connected to a different pair of said alternate step switches, each alternate step switch having three terminals and stepped by its connected stepping motor to electrically connect a first of its terminals, alternately with each step, to the second and third of its terminals; conductor means to separately connect the second and third terminals of each alternate step switch drivingly connected to each stepping motor to the second and third terminals of an alternate step switch drivingly connected to another stepping motor; and circuit means for each stepping motor to connect its electromagnet coil to a voltage source through a series circuit which includes the first terminal of one of its drivingly connected alternate step switches, the first terminal of an alternate step switch connected to another of said stepping motors and, one of the conductor means separately connecting the second and third terminals of said one of its drivingly connected alternate step switches to the second and third terminals of said alternate step switch connected to another of said stepping motors.

2. The electromechanical mechanism of claim 1 wherein the series circuit for each said stepping motor includes a controlled rectifier, said electromechanical mechanism including pulser means to simultaneously gate said controlled rectifiers at predetermined time intervals.

3. The electromechanical mechanism of claim 1 wherein said movable devices are distributor switches.

4. The electromechanical mechanism of claim 1 wherein said plurality of stepping motors comprises three stepping motors, wherein a first alternate step switch is drivingly connected to a first of said stepping motors and said conductor means connect the second and third terminals of said first switch to the second and third terminals, respectively, of a second alternate step switch drivingly connected to a second of said stepping motors, wherein said second stepping motor is drivingly connected to a third alternate step switch and said conductor means connect the second and third terminals of said third switch to the second and third terminals, respectively, of a fourth alternate step switch drivingly connected to the third of said stepping motors, and wherein the third of said stepping motors is drivingly connected to a fifth alternate step switch and said conductors means connect the second and third terminals of said fifth switch to the second and third terminals, respectively, of a sixth alternate step switch driven by the first of said stepping motors.

5. The electromechanical mechanism of claim 1 wherein said stepping motors are rotary stepping motors and said alternate step switches each comprise a rotor surface and a stator surface, said rotor surface supporting an annular conductor having alternate blades and notches on a periphery thereof, said first terminal of each alternate step switch comprising a contact mounted on said stator surface and positioned to continuously engage said annular conductor, said second and third terminals of each alternate step switch comprising spaced contacts mounted on said stator surface and positioned to alternately engage said blades and notches. to a fifth alternate step switch and said conductor means connect 6. In an electromechanical mechanism for selectively positioning a plurality of movable devices, said mechanism comprising a plurality of stepping motors each having an electromagnet coil, there being one stepping motor drivingly connected to each of said movable devices; the improvement comprising:
   there being a plurality of pairs of alternate step switches, each stepping motor drivingly connected to a different pair of said alternate step switches,
   each alternate step switch having three terminals and being stepped by its connected stepping motor to electrically connect a first of its terminals, alternately with each step, to the second and third of its terminals;
   there being conductor means separately connecting the second and third terminals of each said alternate step switch to the second and third terminals of an alternate step switch drivingly connected to a different stepping motor;
   and each electromagnet coil being adapted for connection to a source of operating voltage through a series circuit which includes the first terminal of one of the alternate step switches driven by its own stepping motor, the first terminal of an alternate step switch driven by another of said stepping motors and, alternately after both step switches in said series circuit have been stepped, alternate ones of the conductor means separately connecting the second and third terminals of said one of its drivingly connected alternate step switches to the second and third terminals of said alternate step switch connected to another of said stepping motors.

7. In an electromechanical mechanism for selectively positioning a plurality of movable devices, said mechanism comprising a plurality of stepping motors each having an electromagnet coil, there being one stepping motor drivingly connected to each of said movable devices, the improvement comprising: circuit means to sequentially energize the coils of said stepping motors and thereby operate said motors individually in a predetermined order; said circuit means including means responsive to the operation of each motor except the last motor in said order to connect the coil for the next motor in said order to an operating voltage, and means responsive to energization of the last motor in said order to connect the coil for the first motor in said order to an operating voltage.

* * * * *